United States Patent
Baier et al.

(10) Patent No.: US 6,225,948 B1
(45) Date of Patent: May 1, 2001

(54) METHOD FOR DIRECTION ESTIMATION

(75) Inventors: Paul Walter Baier, Kaiserslautern; Josef Blanz, Kindsbach; Martin Haardt, München; Ralph Schmalenberger, Kaiserslautern, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/407,258

(22) Filed: Sep. 27, 1999

Related U.S. Application Data

(63) Continuation of application No. PCT/DE98/00878, filed on Mar. 25, 1998.

(51) Int. Cl.$^7$ .................................................. G01S 5/02
(52) U.S. Cl. .................................. 342/417; 342/382
(58) Field of Search .................... 342/56, 378, 417, 342/382

(56) References Cited

U.S. PATENT DOCUMENTS

| | | | |
|---|---|---|---|
| 4,965,732 | * 10/1990 | Roy et al. | 364/460 |
| 4,975,710 | * 12/1990 | Bagdady | 342/442 |
| 5,262,789 | * 11/1993 | Sillverstein | 342/368 |
| 5,459,668 | * 10/1995 | Dogan et al. | 364/456 |
| 5,566,209 | * 10/1996 | Forssen et al. | 375/262 |
| 5,745,078 | * 4/1998 | Baghdady | 342/446 |
| 5,892,700 | * 4/1999 | Haardt | 364/807 |
| 6,018,317 | * 1/2000 | Dogan et al. | 342/378 |

FOREIGN PATENT DOCUMENTS 195 11 752 A1 10/1996 (DE).
0 701 334 A2 3/1996 (EP).

OTHER PUBLICATIONS

International Publication No. WO 95/09490 (Forssen et al.), dated Apr. 6, 1995.
International Publication No. WO 96/37974 (Keskitalo et al.), dated Nov. 28, 1996.
"Joint Detection with Coherent Receiver Antenna Diversity in CDMA Mobile Radio Systems" (Jund et al.), IEEE Transactions on Vehicular Technology, vol. 44, No. 1, Feb. 1995, pp. 76–88.
"ESPRIT—Estimation of Signal Parameters Via Rotational Invariance Techniques" (Roy et al.), IEEE Transactions on Acoustics, Speech and Signal Processing, vol. 37, No. 7, Jul. 1989, pp. 984–985.

* cited by examiner

Primary Examiner—Thomas H. Tarcza
Assistant Examiner—Dao L. Phan
(74) Attorney, Agent, or Firm—Herbert L. Lerner; Laurence A. Greenberg; Werner H. Stemer

(57) ABSTRACT

Signals in the form of wave elements of one or more subscriber signals are received at a receiving device assigned a number Ka of receiving sensors and the direction of the signals is estimated. Ka received signals are received via the receiving sensors and are composed of at least one subscriber signal which has a transmitter-specific fine structure impressed on it. A $k^{th}$ subscriber signal, with k=1 . . . K, is transmitted by means of Kd wave elements whose directions of arrival at the receiving location differ. Channel impulse responses assigned to the Ka receiving sensors are determined from the received signals, and the direction of arrival of at least one wave element is determined from the channel impulse responses. The direction estimation can advantageously be used in mobile radio, radar, sonar or seismic measurement systems.

13 Claims, 7 Drawing Sheets

METHOD FOR DIRECTION ESTIMATION

CROSS-REFERENCE TO RELATED APPLICATION

This is a continuation of copending International Application PCT/DE98/00878, filed Mar. 25, 1998, which designated the United States.

BACKGROUND OF THE INVENTION

Field of the Invention

The invention lies in the field of electronic signal processing. More specifically, the invention relates to a method for estimating a direction of incoming wave elements of a received signal, for example in base stations for mobile radio networks or in applications for radar or sonar systems and for seismic measurement systems.

One or more subscriber signals can be caused by transmitting from one or more communication subscribers to a common receiving station, by transmitting from one or more transmitters with superimposed measurement signals or by reflections of a measurement signal on obstructions or geological layers.

Estimation methods for determining the directions of arrival of various signals are described by Roy and Kailath, "ESPRIT—Estimation of Signal Parameters via Rotational Invariance Techniques," IEEE Trans. Acoustics, Speech, and Signal Processing, Vol. ASSP-37, pp.984–95, July 1989. For example, a direction estimation method which is known from German patent application DE 195 11 752 and used as the UNITARY-ESPRIT method leads to the direction of wave elements being determined directly from the received signals.

Direction estimation is very important, by way of example, in the context of mobile radio application and the novel method of direction estimation will be discussed in the following in the context of mobile radio.

With mobile radio or methods similar to mobile radio, a new field of application has been opened up for direction estimation. When signals propagate in a propagation medium, they are subject to interference caused by noise. Owing to diffraction and reflections, signal components pass through different propagation paths and are superimposed at the receiver. This leads to superposition cancellation effects. Furthermore, if there is more than one signal source, this leads to the signals being superimposed. Frequency-division multiplex (FDMA), time-division multiplex (TDMA) or a method which is known as code division multiplex (CDMA) are used to distinguish between the signal sources, and thus to evaluate the signals.

If, for example, a CDMA (code division multiple access) method is used for subscriber separation, a plurality of subscriber signals can be transmitted in one frequency channel at the same time. The individual signals are separated in the receiver.

Mathematical descriptions, the method of operation, and the structure of CDMA (Code Division Multiple Access) radio transmission systems are described by Jung and Blanz in "Joint Detection With Coherent Receiver Antenna Diversity in CDMA Mobile Radio Systems," IEEE Transactions on Vehicular Technology, Volume VT-44, 1995, pages 76–88. When such systems are used for mobile communication, there is a radio interface between fixed-position base stations and moving mobile stations. The transmission path from a base station to a mobile station is called the downlink path, and the transmission path from a mobile station to a base station is called the uplink path.

The Jung and Blanz article furthermore shows that the transmission quality in such radio transmission systems can be improved since it is possible to use an arrangement of a plurality of receiving sensors instead of a single receiving sensor. In accordance with the terminology used in the above-mentioned document, K denotes the number of subscriber signals which are transmitted from a base station at the same time in the same frequency channel, for example of supplied mobile stations. Ka denotes the number of receiving sensors which are assigned to a receiving device, for example the base station. In one such scenario, there are, therefore, K--Ka radio channels in the uplink path between the K mobile stations and the Ka receiving sensors in the base station. Each of the radio channels is characterized by a discrete-time baseband equivalent of its channel pulse response $g^{(k)\ (ka)}$ where k=1 . . . K, ka=1 . . . Ka. These channel impulse responses $g^{(k)\ (ka)}$ are used for channel modeling in data detection. That method does not take into consideration any statements relating to the directions in which wave elements arrive.

International PCT publication WO 95/09490 describes a mobile radio system with spatial subscriber separation, in which two different channel classes with a different capacity are used. After determining the position of the mobile station, narrow directional polar diagrams are used for transmission.

European Patent Application EP 0 701 334 A2 discloses a method for determining impulse responses of a radio channel in a cellular radiotelephone system.

SUMMARY OF THE INVENTION

It is accordingly an object of the invention to provide an improved method for direction estimation, which overcomes the above-mentioned disadvantages of the heretofore-known methods of this general type and which results in a reduction in the influence of interference signals on the direction estimation, with little calculation complexity.

With the foregoing and other objects in view there is provided, in accordance with the invention, a method for direction estimation for wave elements of one or more subscriber signals. The method comprises the following steps:

assigning to a receiving device a number Ka of receiving sensors;

receiving Ka signals caused by at least one subscriber signal having impressed thereon a transmitter-specific fine structure, wherein a $k^{th}$ subscriber signal, with k=1 . . . K, is transmitted by means of Kd wave elements having mutually differing directions of arrival at the receiving sensors;

determining channel impulse responses assigned to the Ka receiving sensors from the received signals; and determining the direction of arrival of at least one of the wave elements from the channel impulse responses.

In other words, in the method for direction estimation of wave elements of at least one subscriber signal, a plurality of receiving sensors are assigned to one receiving device. The same plurality of received signals are received via the receiving sensors, being caused by at least one subscriber signal which has a transmitter-specific fine structure impressed on it, in which case a $k^{th}$ subscriber signal, k=1 . . . K, is transmitted by means of Kd wave elements whose directions of arrival at the receiving location differ. Channel impulse responses assigned to the Ka receiving sensors are determined from the received signals, and the direction of arrival of at least one wave element is determined from the channel impulse responses.

The accuracy of the direction estimation is improved since the channel impulse responses already take account of the characteristics of the channels as raw information for the direction estimation. Knowledge relating to the received signal, in the form of the transmitter-specific fine structure, can be used for channel estimation in the receiving device. The direction estimation is thus more accurate than when using unknown data which are still to be detected.

In accordance with an added feature of the invention, the channel impulse responses are determined from training sequences of the subscriber signals, wherein the training sequences form the transmitter-specific fine structures. Such training sequences are known from mobile radio, for example as midambles in GSM useful channels. These training sequences can be used in a simple manner for the method according to the invention. The method according to the invention can thus be implemented in mobile radio networks with little complexity.

In accordance with an additional feature of the invention, the signals arriving in the receiving device are superimposed subscriber signals from a plurality of transmitters or reflectors, the signals being transmitted concurrently in one frequency channel. That is, the subscriber signals (which can be separated by the transmitter-specific fine structures) from a plurality of transmitters or reflectors arrive at the receiving device and are superimposed to form the received signals, in which case these signals are transmitted at the same time in one frequency channel. The fine structures can advantageously at the same time be used for direction estimation and for subscriber separation, when message transmission is taking place. This means a further reduction in complexity at the receiver end.

In accordance with another feature of the invention, the step of determining the direction of arrival of the wave elements further takes account of information relating to a direction of arrival, a power, a spectrum, and/or a correlation matrix of interference signals. The greater the amount of knowledge that is available about interference sources, the better is it possible to evaluate the signals for which the directions of arrival are intended to be estimated. This measure also allows the direction estimation to be improved.

In accordance with a further feature of the invention, the subscriber signals are separated by despreading using individual subscriber codes. In this case, the directions of arrival of the wave elements can be assigned to the subscriber signals. This type of assignment allows the advantageous use of the invention, for example in mobile radio systems in which the direction estimation represents additional information for data detection.

In accordance with again an added feature of the invention, high-resolution direction estimation methods are used in the step of determining the direction of arrival. High-resolution direction estimation methods include, for example, a MUSIC method (Multiple Signal Classification) or a single-dimensional or multi-dimensional UNITARY ESPRIT method (Estimation of Signal Parameters via Rotational Invariance Techniques). These lead to high-precision direction estimation, building on the channel impulse responses, with economic computation complexity. The MUSIC or ESPRIT methods use knowledge from the complex radiation polar diagram of the receiving sensors and/or specific geometric preconditions for the arrangement of the receiving sensors, in order to carry out an accurate direction estimation that involves little signal processing complexity.

In accordance with yet an additional feature of the invention, specific values are averaged over a time interval in the step of determining the directions of arrival of the wave elements. The direction of arrival varies little within a time interval which may correspond to a multiple of the coherence time of the channel impulse responses. Averaging improves the direction estimation, since random errors are reduced. In the case of radio-block transmission of subscriber signals in TDMA systems, the averaging can be carried out for a radio block or else for a large number of radio blocks. The number of radio blocks for averaging, that is to say the time interval, may in this case be varied, with changes in the directions of arrival leading to a change in the time interval. If the channel conditions change quickly, for example if the movement of a mobile station speeds up, then the direction estimation can be limited to a shorter time interval.

In addition to the applications explained above in mobile radio systems, further advantageous applications are provided in a radar or sonar system or in a seismic measurement system. In the case of the latter applications, the at least one subscriber signal may also arrive at the receiving station in the form of one or more reflected wave elements.

Other features which are considered as characteristic for the invention are set forth in the appended claims.

Although the invention is illustrated and described herein as embodied in method for direction estimation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

A first exemplary embodiment of the invention will now be explained with reference to FIGS. 1 to 5.

Figure 1:
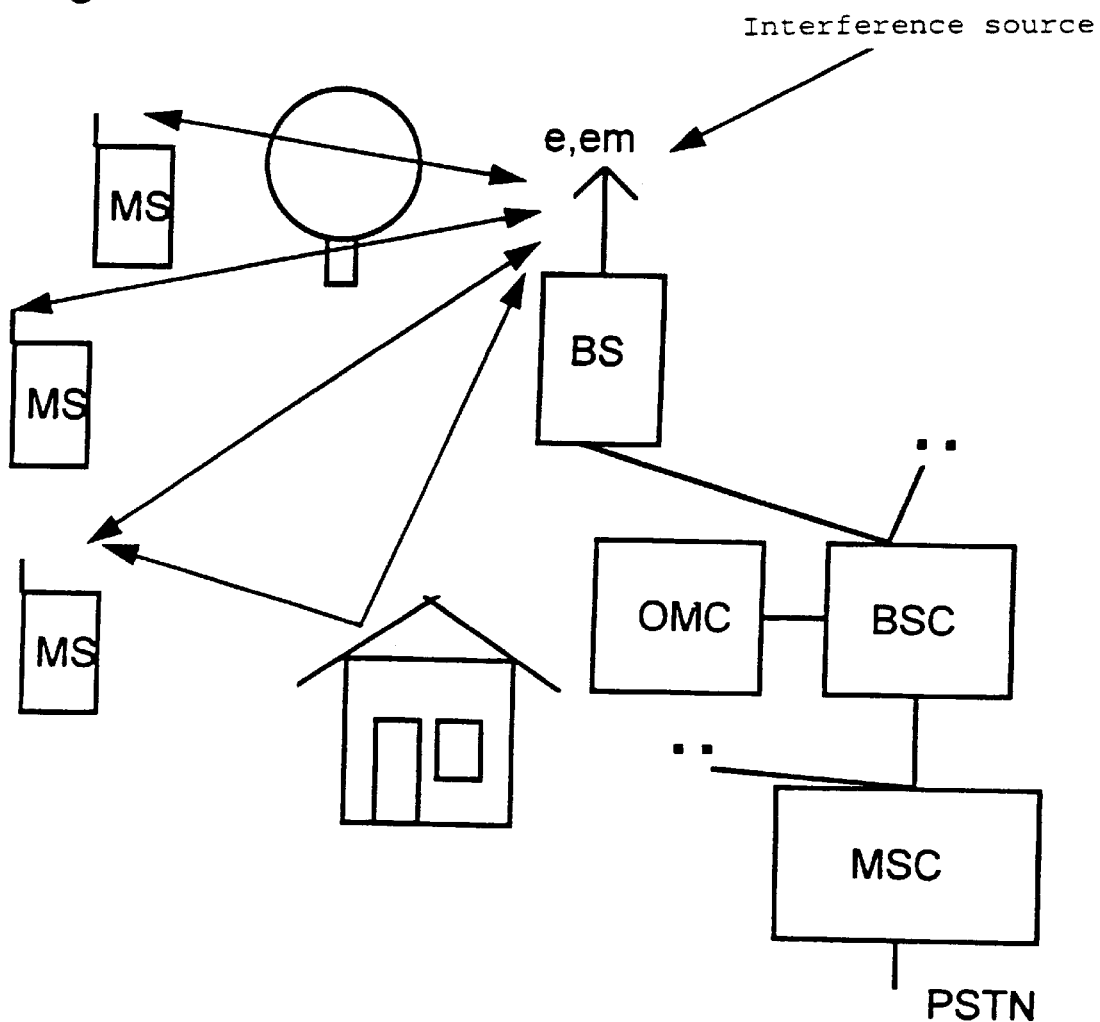
FIG. 1 is a shows a block diagram of a mobile radio network.

Referring now to the figures of the drawing in detail and first, particularly, to FIG. 1 thereof, there is seen a structure of the mobile communications system corresponding to that of a known GSM mobile radio network. The network comprises a large number of mobile switching centers MSC, which are networked with one another and produce access to a fixed network PSTN. The mobile switching centers MSC are connected to in each case at least one base station controller BSC. Each base station controller BSC in turn allows a connection to at least one base station BS. Such a base station BS is a radio station which can set up an information link to mobile stations MS via a radio interface.

FIG. 1 illustrates three exemplary radio links between three mobile stations MS and one base station BS. An operation and maintenance center OMC provides monitoring and maintenance functions for the mobile radio network, or for parts of it. This structure can be transferred to other mobile radio networks in which the invention may be used.

The communication links between the base station BS and the mobile stations MS are subject to multipath propagation. The multiple paths are caused by reflections, for example on buildings or vegetation, in addition to the direct propagation path. Assumed that the mobile stations MS are moving, multipath propagation together with other interference leads to the signal components of the various propagation paths of a subscriber signal being superimposed as a function of time at the receiving base station BS. It is also assumed that the subscriber signals from different mobile stations MS are superimposed at the receiving location to form a received signal e, em. The function of the receiving base station BS is to detect data d transmitted in the subscriber signals, and to assign such data d to individual, subscriber-specific communication links.

Figure 2:
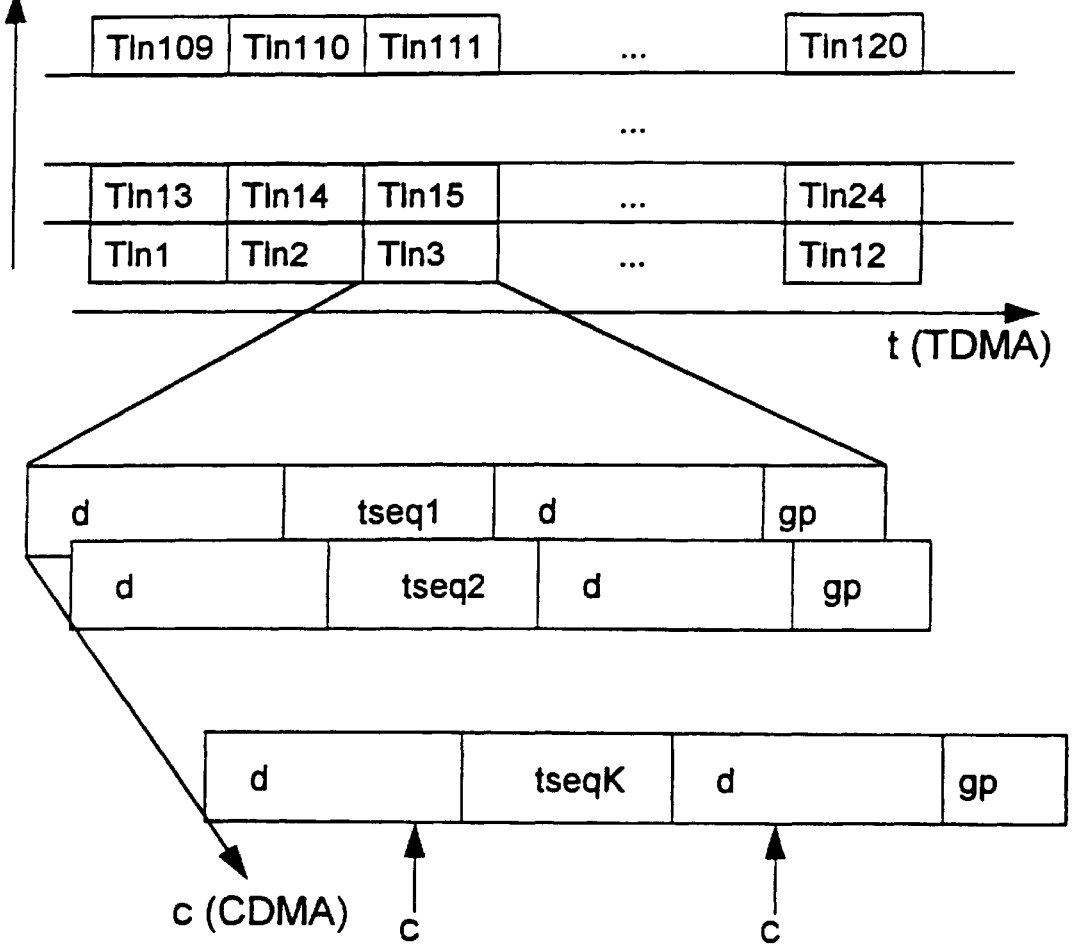
FIG. 2 is a timing block diagram of a frame structure of the radio blocks for the radio interface.

Referring now to FIG. 2, there is shown an exemplary transmission of the subscriber signals via the radio interface. The radio interface in this case has a frequency-division multiplex (FDMA), a time-division multiplex (TDMA) and a code-division multiplex component (CDMA). A number of frequency bands are provided along a frequency axis f for the mobile radio network. Furthermore, a time axis t is subdivided into a time frame comprising a plurality of time slots per time frame. The transmission thus takes place in radio blocks. The subscriber signals from a plurality of mobile stations MS are assigned to a subscriber group Tln1, Tln2 Tln120. In other words, during the radio block of a subscriber group, for example the subscriber group Tln3 for the three mobile stations MS in FIG. 1—that is to say K=3 in the exemplary embodiment, the subscriber signals which are denoted by different subscriber codes are superimposed to form a received signal e, em, which can be evaluated by a receiving device in the base station BS.

Within a radio block, a subscriber signal comprises two data-carrying sections with data d, in the center of which a subscriber-specific training sequence tseq1 to tseqK is introduced. The radio block is terminated by a guard time or guard period gp. The subscriber signals are distinguished by a subscriber code c, which is carried within the data-carrying sections in the form of subscriber-specific fine structures which are defined by the subscriber-specific CDMA codes $c^{(k)}$, k=1 ... K. The subscriber signals can be separated by means of these CDMA codes c (which will be referred to as subscriber codes in the following text), which are known at the receiving end.

Figure 3:
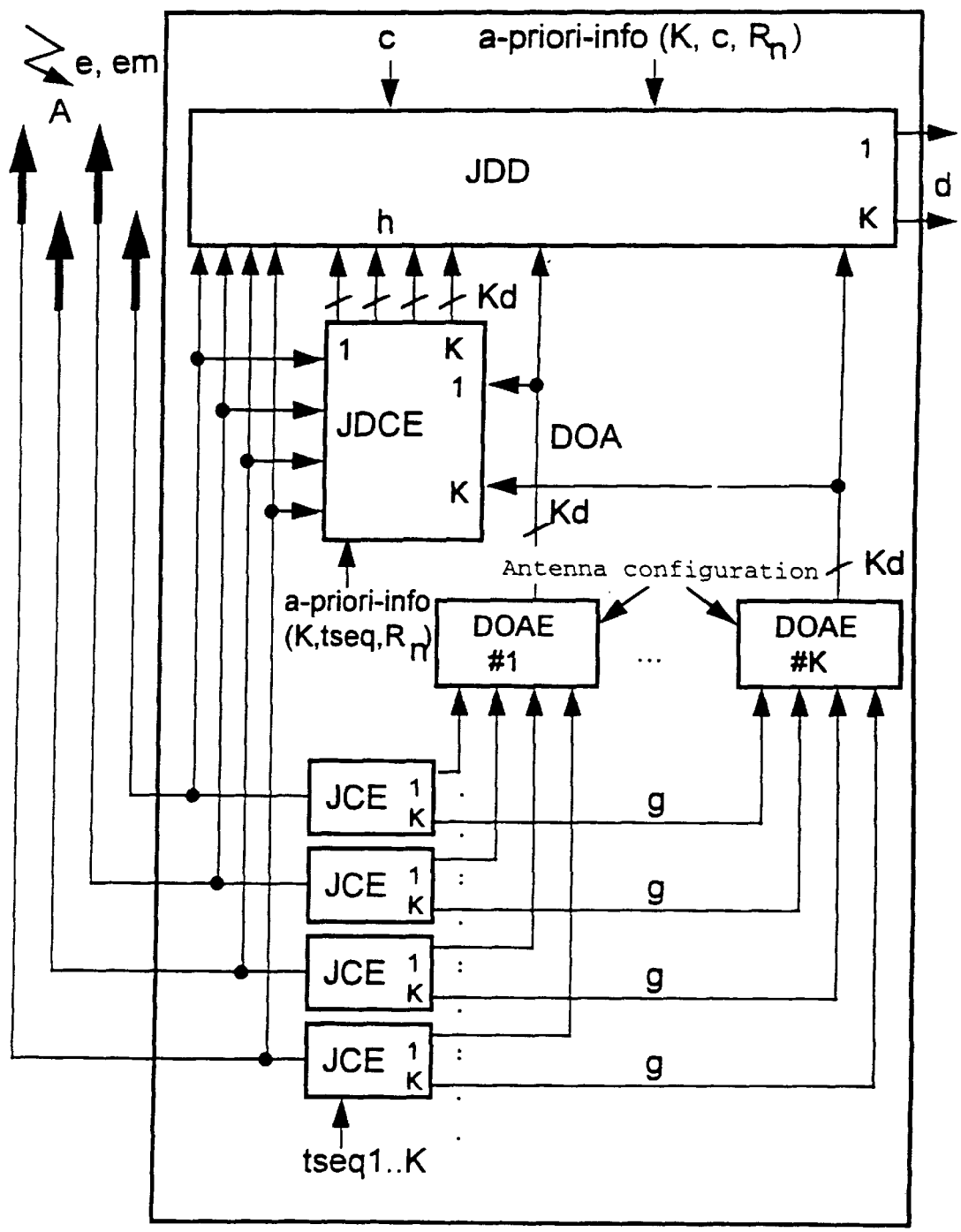
FIG. 3 is a block diagram of a receiving device having associated receiving sensors.

FIG. 3 shows a receiving device having associated receiving sensors A. The receiving device is part of the base station BS and receives received signals e, em from the transmitting mobile stations MS in the mobile radio network. The following text describes a situation when the base station BS is receiving although, nevertheless, there is normally a two-way communication link, that is to say the base station BS also has a transmitting device.

Ka=4 receiving sensors A form an antenna device, which is designed as an intelligent antenna device, that is to say a plurality of receiving sensors A in this intelligent antenna device receive received signals e or em at the same time. These signals are combined with one another in such a way that the transmission quality is improved in comparison with systems having one receiving antenna.

Digital signals are produced from the received signals e, em, for example by conversion to baseband and subsequent analog/digital conversion, and these digital signals are evaluated in the receiving device.

The receiving device comprises a plurality of channel estimators JCE, a plurality of direction estimators DOAE, a directional channel estimator JDCE, and a detection device JDD. In addition to the received signals e, em, the receiving device has a-priori information about the number K of subscribers, their training sequences tseq1 ... tseqK and their subscriber code c, and information relating to interference signals may also possibly be available.

The—already digitized—received signals em from the receiving sensors A are supplied to the channel estimators JCE. The channel estimators JCE are used to determine the non-directional channel impulse responses g by means of a Gauss-Markov estimate, or a maximum-likelihood estimate. The received signal from a receiving sensor A is evaluated per channel estimator JCE, with K non-directional channel impulse responses g being produced respectively at the outputs of the channel estimators JCE. These non-directional channel impulse responses g are calculated from the received signals $em^{(ka)}$, ka=1 ... Ka, which are caused by the training sequences tseq1 to tseqK of the K subscriber signals.

The non-directional channel impulse responses g are each supplied to the K direction estimators DOAE which carry out a direction estimation related to subscribers, based on these non-directional channel impulse responses g. The number of directions of arrival determined per subscriber signal is denoted by Kd. This number Kd may differ from subscriber signal to subscriber signal. The single-dimensional or multi-dimensional UNITARY ESPRIT algorithm is used to determine the directions of arrival DOA (also called the incidence directions). The direction estimation according to the invention is carried out in the direction estimators DOAE.

In the directional channel estimator JDCE, the received signals $em^{(ka)}$ caused by the training sequences tseq1 to tseqK in the receiving sensors A and the specific directions of arrival DOA of the wave elements are processed, and directional channel impulse responses h are determined from them. This channel estimation is based on the maximum-likelihood estimation method.

Finally, the Ka received signals $e^{(ka)}$, ka=1 ... Ka, the specific directional channel impulse responses h and the specific directions of arrival DOA are supplied to the detection device JDD, which also processes the subscriber codes c and additional a-priori information known about the direction of arrival of interference signals in the form of $R_n$ or the geographical position of mobile stations MS with respect to the base station BS.

The detection of the data d is carried out in this detection device JDD, based on the received signals $e^{(ka)}$ caused by the sections which carry data. A zero-forcing method is used for this purpose. Alternative advantageous methods are the maximum-likelihood estimation or an MMSE method. The data detection results in the detected data d for the K subscriber signals for a radio block being present at the outputs of the detection device JDD.

In the method of data detection according to the invention, a channel estimation of channel impulse responses g is carried out in a first method step, without considering directional inhomogeneities. In a second step, the determined channel impulse responses g are used to determine the incidence directions DOA of one or more wave elements, following which, in a third step, directionally selective channel impulse responses h, that is to say channel impulse responses which can be assigned to the different incidence directions, are determined from the received signals by taking the incidence directions DOA into account. This step is based on the is knowledge that each conventional, directionally not selective channel impulse response $g^{(k)\,(ka)}$ is generated by superimposing Kd directionally selective channel impulse responses $h^{(k)\,(kd)}$, where k=1 . . . K and kd=1 . . . Kd.

Thus:

$$g^{(k)(ka)} = \sum_{kd=1}^{Kd} a^{(k)(ka)(kd)} \cdot h^{(k)(kd)}, \quad (1)$$

where $k = 1 \ldots K$ and $ka = 1 \ldots Ka$

The terms $a^{(k)\,(ka)\,(kd)}$ are complex weighting factors for a superposition of directionally selective channel impulse responses $h^{(k)\,(kd)}$ to form the directionally not selective channel impulses responses $g^{(k)\,(ka)}$. Information or knowledge relating to incidence directions or correlation matrices of interference wave elements may also be used to determine the directionally selective channel impulse responses h.

The total number W*K*Ka parameters to be estimated in $g^{(k)\,(ka)}$, k=1 . . . K, ka=. . . Ka is normally considerably greater, in the case of multi-antenna systems, than the total number W*K*Kd of parameters to be estimated in $h^{(k)\,(kd)}$, k=1 . . . K, kd=. . . 1 . . . Kd, since Ka>Kd. The computation complexity for assessing the parameters is thus reduced using the method according to the invention.

During the reception of a combined received signal em, which advantageously results from the training sequences in the subscriber signals and contains the received signals $em^{(ka)}$, ka=1 . . . Ka from the Ka receiving sensors, this received signal em has the form:

$$em = G \cdot h + n_m \quad (2)$$

where G is a known matrix (L*Ka)×(W*K*Kd) where L denotes the number of discrete-time samples of the received signal em and W denotes the length of the channel impulse responses. This matrix G results from the geometrical disposition or configuration and the complex characteristics of the Ka receiving sensors, from the transmitted training sequences and from the Kd incidence directions DOA. The vector h includes the discrete-time baseband equivalent of the K*Kd directionally selective channel impulses responses $h^{(K)\,(Kd)}$. The term $n_m$ denotes an unknown (L*Ka) column vector of a time-discrete interference signal.

G and em are known from equation (1), so that the directionally selective channel impulse responses h can be determined.

During reception of the sections carrying data, the combined received signal e of the received signals $e^{(ka)}$ from the receiving sensors has the form:

$$e = A \cdot d + n \quad (3)$$

where A is a (M*Ka)×(N*K) matrix, in which M denotes the number of discrete sampling instants for the received signal and N denotes the number of data symbols transmitted per subscriber; n is again an unknown (M*Ka) column vector of a time-discrete interference signal.

In equation (3), A and e are known, so that the data d can be detected. A is known from the K*Kd incidence directions, the directionally selective channel impulse responses h, the geometrical configuration and the complex characteristics of the receiving sensors and, when using a CDMA subscriber separation, from the subscriber code used.

In a fourth method step, the data d are detected from the received signals e resulting from those sections of the K subscriber signals, which carry data, using the previously determined incidence directions DOA and the directionally selective channel impulse responses h. If required, knowledge relating to incidence directions, the power, the spectrum and the covariance matrix of interference signals may also be used in this step.

The directionally selective channel impulse responses h are advantageously determined using the Gaussian-Markov estimation method, in which an estimated value ĥ for the directionally selective channel impulse responses h can be calculated from:

$$\hat{h} = (G^{\cdot T} \cdot \tilde{R}_n^{-1} \cdot G)^{-1} \cdot G^{\cdot T} \cdot \tilde{R}_n^{-1} \cdot em \quad (4)$$

$\tilde{R}_n$ denotes the covariance matrix for the interference signal $n_m$, which is determined from the incidence directions and relative powers of the interference wave elements, the spectra of the interference signals, and from the geometrical configuration and complex radiation characteristic of the receiving sensors. This method corresponds to the maximum-likelihood estimation of the directionally selective channel impulse responses h, and can be carried out with relatively little effort by a recursive solution of (4).

Relationships between the direction estimation and the determination of the directionally selective channel impulse responses, respectively, and the data detection are used as follows. The K subscriber signals are composed of sections carrying data and training sequences, in which case the directionally selective channel impulse responses are determined from the received signals resulting from the training sequences of the K subscriber signals, and the data are detected from the received signals resulting from the sections carrying data.

In addition, in order to reduce the complexity, the incidence directions DOA and/or the directionally selective channel impulse responses h can be determined again, using a follow-up or tracking method, after a period which is longer than a frame structure related to a radio block.

Figure 4:
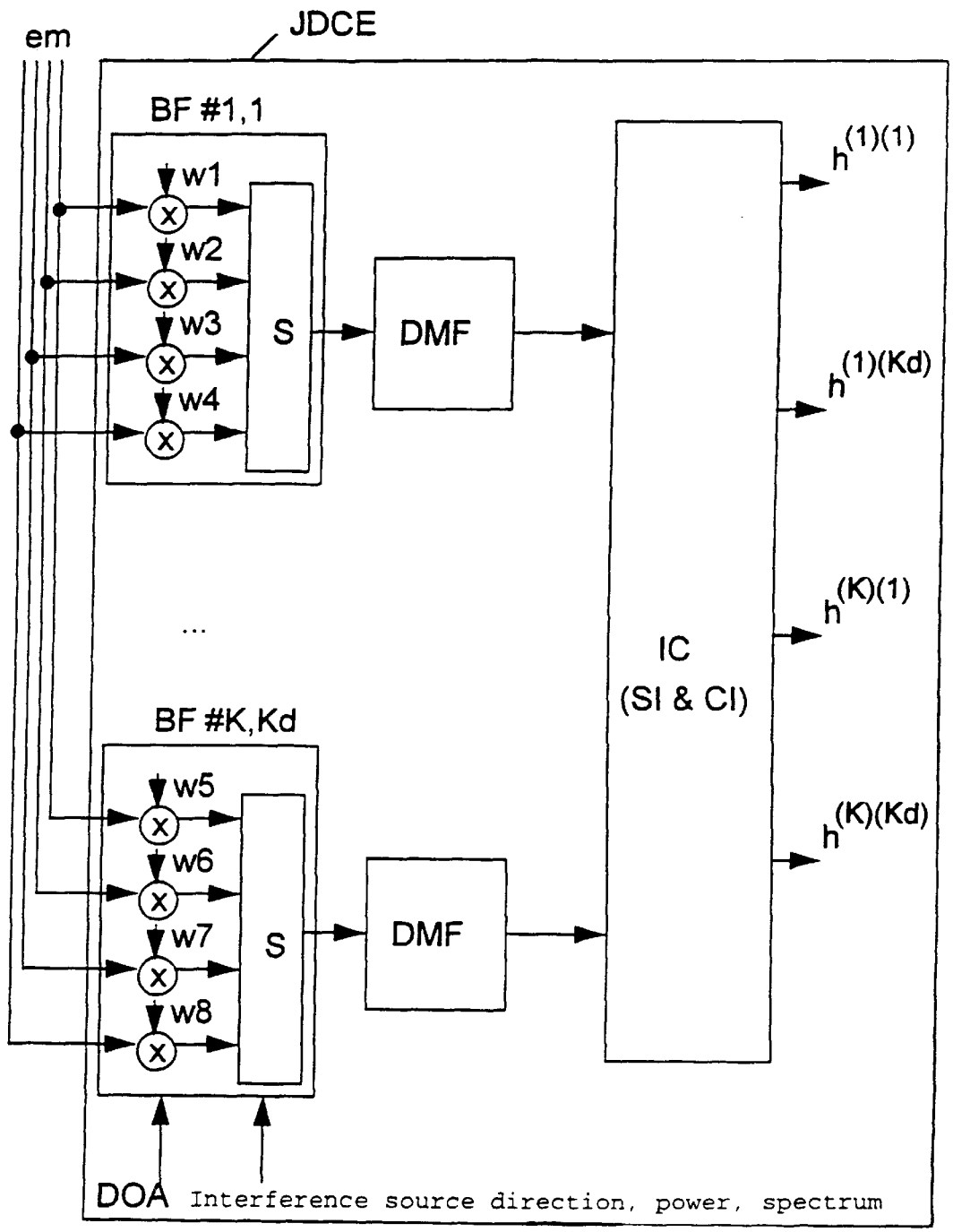
FIG. 4 is a block diagram of a directional channel estimator.

FIG. 4 shows a directionally selective channel estimation device JDCE, which contains beam formers BF which, for each of the Ka received signals $em^{(ka)}$ apply a weighting, resulting from beam-former-specific weighting factors w1 to w4 and w5 to w8, and add the signal components in an adder device S to form a signal for which the signal-to-noise ratio is maximized, with this signal subsequently being supplied to a decorrelating signal-matched filter DMF. The self-interference SI and cross-interference CI are compensated for in a device IC for interference cancellation, and directionally selective channel impulse responses h are obtained.

In addition, the information relating to the incidence directions DOA of the wave elements and relating to the directions and relative powers of the interference wave elements are processed in the beam formers BF. These directions influence the weighting factors w1 to w4 and w5 to w8 for each beam former BF individually. The beam formers BF and the decorrelating, signal-matched filters DMF act like a spatially resolving, decorrelating signal-matched filter, and are respectively applied to one wave element, and thus to K*Kd wave elements.

Figure 5:
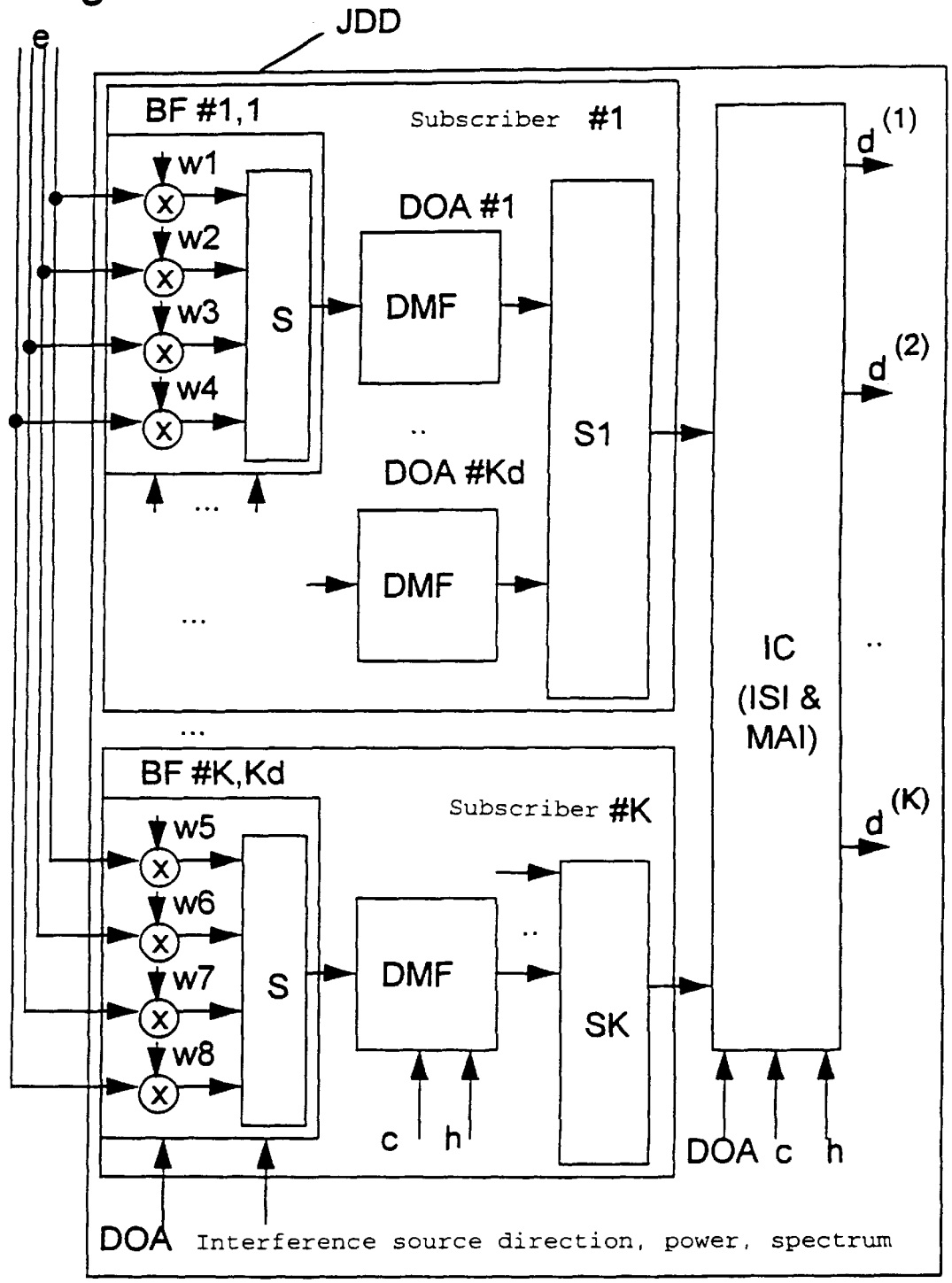
FIG. 5 is a block diagram of a detection device.

FIG. 5 shows the detection device JDD. This detection device JDD processes those sections of the received signals e which carry data, in which case a spatially resolving, decorrelating signal-matched filter superimposes the K*Kd wave elements of the received signals e, in order to maximize the signal-to-noise ratio, in accordance with the described procedure in the directionally selective channel estimation device JDCE. This maximization of the signal-to-noise ratio is carried out for each incidence direction DOA of each subscriber signal, with the Kd signal components of the individual wave elements of a subscriber signal being superimposed in adder devices S1 to SK, using the maximum-ratio-combining method.

The subscriber signals are subsequently supplied to a device IC for interference cancellation, which compensates for the intersymbol interference ISI and the multiple access interference MAI. The information relating to the subscriber codes c, the incidence directions DOA, the directionally selective channel impulse responses h and, possibly, an a-priori-knowledge relating to the interference sources in the form of $R_n$ is also processed in this case. The detected data d from the subscriber signals are produced separately at one output of the device IC for interference cancellation. A so-called JD (Joint Detection) method is used for interference cancellation.

The receiving device reduces the time dispersion and the variance of the received signals. Furthermore, spatial resolution allows a greater number of mobile stations MS to be supplied in a radio area of a base station BS, and the radio area can be shaped by the directional effect such that the transmission power levels of the mobile stations MS are also considerably reduced.

Figure 6:
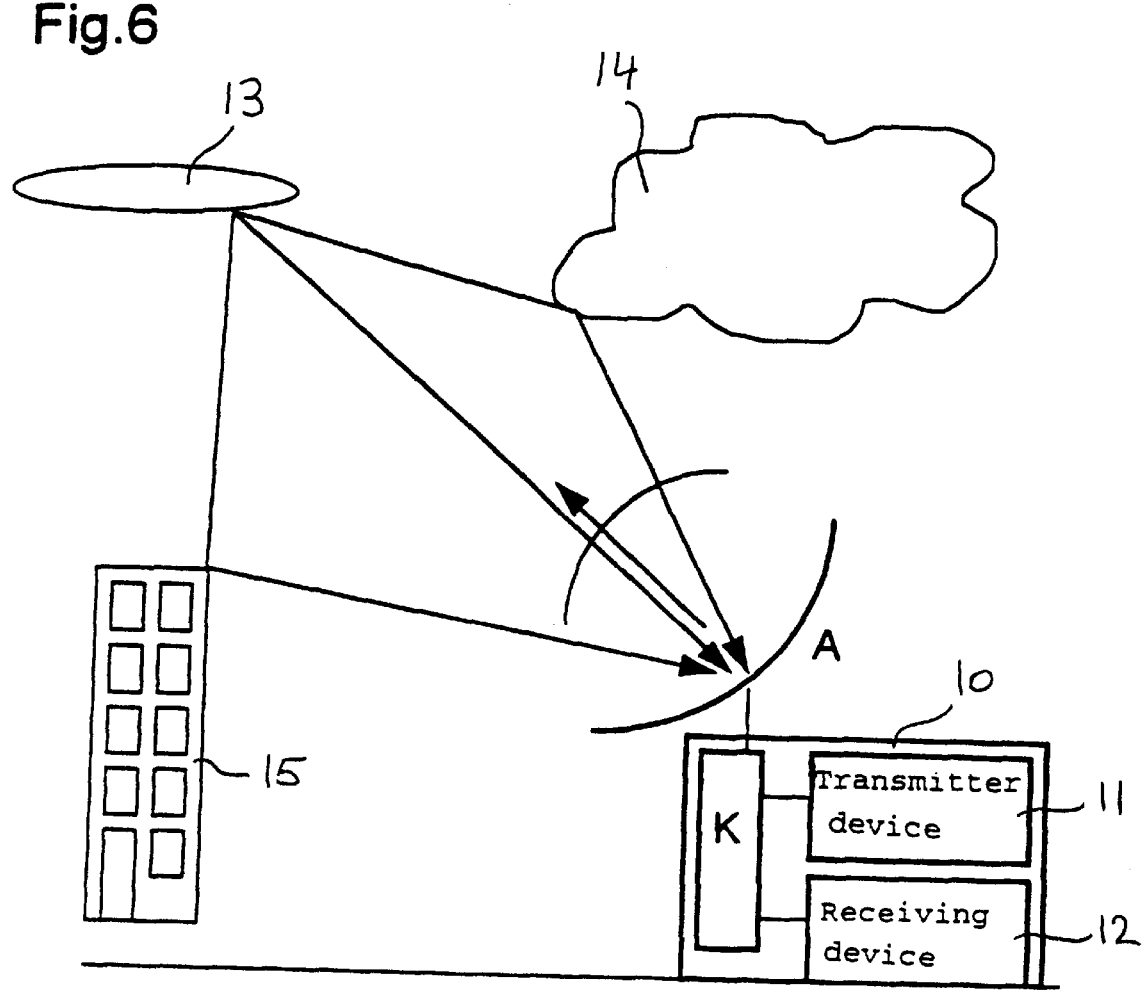
FIG. 6 is a schematic illustration of a radar scenario.

Reference will now be had to FIG. 6, which illustrates a second exemplary embodiment, using a radar system scenario.

A radar system 10 comprises a transmitting device and a receiving device. The two are connected via a coupling element K to an antenna device A having Ka receiving sensors. During a transmission period, a transmission signal which is provided with a transmitter-specific fine structure is transmitted via the antenna device. A portion of the transmitted energy reaches a flying object or missile 13, where it is reflected.

The reflected signal, called the subscriber signal in the following text, comprises a large number of wave elements, with Kd wave elements reaching the antenna device A via different propagation paths. The wave elements of the subscriber signal are thrown back to the radar system by refraction, diffraction and reflection on clouds 14 or buildings 15, and are received and evaluated in the receiving device 10.

Figure 7:
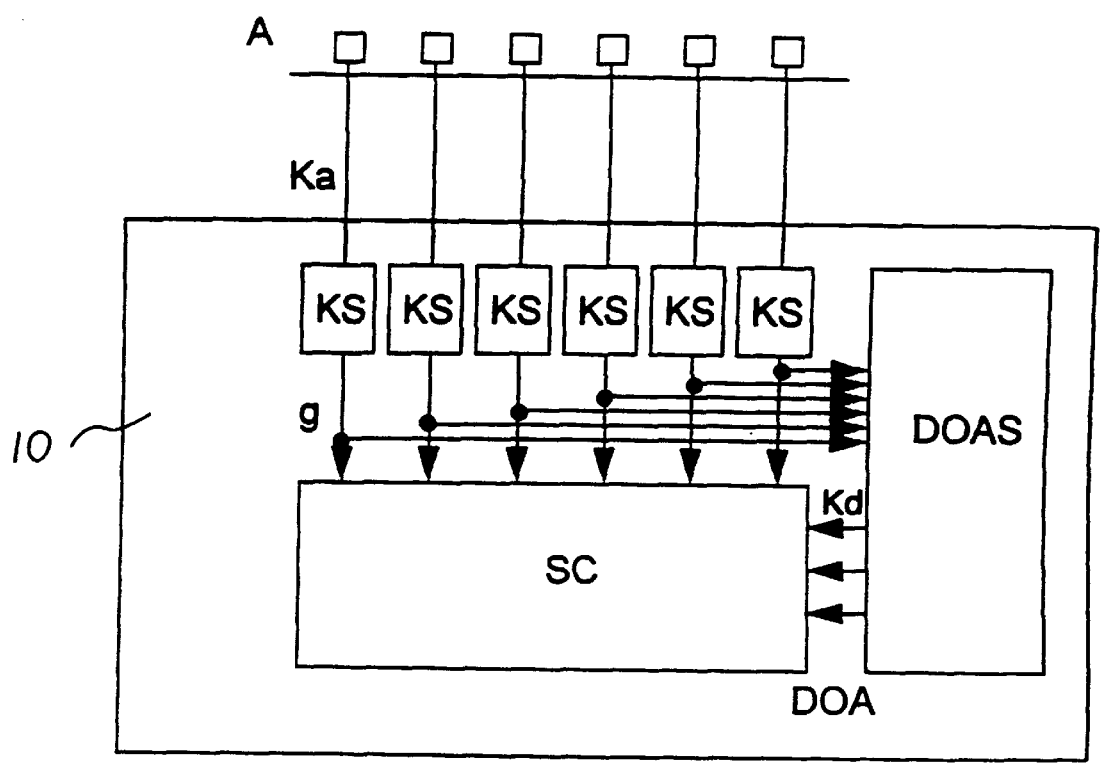
FIG. 7 is a block diagram of a receiving device for the radar system.

The schematic of FIG. 7 shows the receiving device 10 with which the Ka receiving sensors A are associated. A channel impulse response g is estimated, related to sensors, in Ka channel estimators KS. For this purpose, the correlation of the known transmitter-specific fine structure with the received signal is determined in the radar system.

A direction estimator DOAS is supplied with the Ka channel impulse responses g determined in this way. The DOAS uses them to determine these Kd directions of arrival DOA for the subscriber signal. The methods used for channel and direction estimation correspond to those in the first exemplary embodiment.

The channel impulse responses g and the directions of arrival DOA of the wave elements of the subscriber signal are evaluated in a signal combiner SC in the radar system in order to determine the position and the flight speed of the object. The position is determined from the directions of arrival DOA, the signal delay time, and the received field strength of the wave elements. The speed of flight is determined from the Doppler frequency.

We claim:

1. A method for direction estimation for wave elements of at least one subscriber signal, which comprises:

assigning to a receiving device a number Ka of receiving sensors;

receiving Ka signals caused by at least one subscriber signal having impressed thereon a transmitter-specific fine structure, wherein a given subscriber signal is transmitted by means of a plurality of wave elements having mutually differing directions of arrival at the receiving sensors;

determining channel impulse responses assigned to the Ka receiving sensors from the received signals; and determining the direction of arrival of at least one of the wave elements from the channel impulse responses.

2. The method according to claim 1, wherein the step of determining the channel impulse responses comprises determining the channel impulse responses from training sequences of the subscriber signals, wherein the training sequences form the transmitter-specific fine structures.

3. The method according to claim 1, wherein the signals arriving in the receiving device are superimposed subscriber signals from a plurality of transmitters or reflectors, the signals being transmitted concurrently in one frequency channel.

4. The method according to claim 1, wherein the step of determining the direction of arrival of the wave elements further takes account of information relating to at least one value selected from the group consisting of a direction of arrival, a power, a spectrum, and a correlation matrix of interference signals.

5. The method according to claim 3, which comprises separating the subscriber signals by despreading using individual subscriber codes.

6. The method according to claim 1, which comprises using high-resolution direction estimation methods in the step of determining the direction of arrival.

7. The method according to claim 6, which comprises using a MUSIC method in the step of determining the direction of arrival.

8. The method according to claim 6, which comprises using one of a single-dimensional and a multi-dimensional UNITARY-ESPRIT method in the step of determining the direction of arrival.

9. The method according to claim 1, which comprises averaging specific values over a time interval in the step of determining the directions of arrival of the wave elements.

10. The method according to claim 1, wherein the subscriber signal is a subscriber signal in a mobile radio system, and the receiving device is a receiver at a base station of a mobile radio system.

11. The method according to claim 1, wherein the receiving device is a receiver in a radar system.

12. The method according to claim 1, wherein the receiving device is a receiver in a sonar system.

13. The method according to claim 1, wherein the receiving device is a sensor system in a seismic measurement system.

* * * * *